US010939140B2

(12) United States Patent
Davies et al.

(10) Patent No.: US 10,939,140 B2
(45) Date of Patent: Mar. 2, 2021

(54) SELECTIVE CAPTURE AND PRESENTATION OF NATIVE IMAGE PORTIONS

(75) Inventors: Michael Davies, Marina Del Ray, CA (US); David Eric Shanks, Los Angeles, CA (US); Gerald Steinberg, Marina Del Ray, CA (US)

(73) Assignee: FOX SPORTS PRODUCTIONS, LLC, Los Angeles, CA (US)

( * ) Notice: Subject to any disclaimer, the term of this patent is extended or adjusted under 35 U.S.C. 154(b) by 35 days.

(21) Appl. No.: 13/567,323

(22) Filed: Aug. 6, 2012

(65) Prior Publication Data
US 2013/0033605 A1 Feb. 7, 2013

Related U.S. Application Data

(60) Provisional application No. 61/515,549, filed on Aug. 5, 2011, provisional application No. 61/563,126, filed on Nov. 23, 2011.

(51) Int. Cl.
*H04N 21/218* (2011.01)
*H04N 7/01* (2006.01)
(Continued)

(52) U.S. Cl.
CPC ....... *H04N 21/21805* (2013.01); *G09G 5/005* (2013.01); *H04N 5/217* (2013.01);
(Continued)

(58) Field of Classification Search
CPC .................................................. H04N 21/4728
See application file for complete search history.

(56) References Cited

U.S. PATENT DOCUMENTS 4,184,270 A   1/1980 Presbrey
4,679,068 A   7/1987 Lillquist et al.
(Continued)

FOREIGN PATENT DOCUMENTS

CA   2213485 A1   2/1995
CN   101090472   12/2007
(Continued)

OTHER PUBLICATIONS

PCT Application No. PCT/US2012/049707 Written Opinion and International Search Report dated Jan. 7, 2013, 13 pages.
(Continued)

*Primary Examiner* — Ricky Chin
(74) *Attorney, Agent, or Firm* — Cantor Colburn LLP

(57) ABSTRACT

A system and method for selective capture of and presentation of native image portions are provided. In a first embodiment a first image or video is captured at a first resolution, which resolution is greater than high definition and higher than a predetermined broadcast display resolution. A desired portion of the native, first image or video is then displayed at a second, lower resolution, which resolution is less than and closer to the predetermined broadcast display resolution. Accordingly, a selected portion of the captured image may be displayed at or near the predetermined broadcast display resolution. In other exemplary embodiments, video is captured at a first frame rate that is higher than a predetermined broadcast frame rate, and an extraction window extracts frames from a portion of the native, first video to provide improved broadcast quality of the portion(s) selected by the extraction window.

56 Claims, 4 Drawing Sheets

(51) Int. Cl.
*G09G 5/00* (2006.01)
*H04N 21/4728* (2011.01)
*H04N 5/232* (2006.01)
*H04N 5/222* (2006.01)
*H04N 5/225* (2006.01)
*H04N 5/217* (2011.01)
*H04N 21/4223* (2011.01)

(52) U.S. Cl.
CPC ........... *H04N 5/225* (2013.01); *H04N 5/2228* (2013.01); *H04N 5/23206* (2013.01); *H04N 5/23216* (2013.01); *H04N 7/0117* (2013.01); *H04N 7/0125* (2013.01); *H04N 7/0127* (2013.01); *H04N 21/4223* (2013.01); *H04N 21/4728* (2013.01); *G09G 2340/045* (2013.01); *G09G 2340/0428* (2013.01); *H04N 5/222* (2013.01)

(56) References Cited

U.S. PATENT DOCUMENTS

| | | | |
|---|---|---|---|
| 4,975,770 A | 12/1990 | Troxell | |
| 5,342,051 A | 8/1994 | Rankin et al. | |
| 5,413,345 A | 5/1995 | Nauck | |
| 5,489,099 A | 2/1996 | Rankin et al. | |
| 5,517,236 A | 5/1996 | Sergeant et al. | |
| 5,729,471 A | 3/1998 | Jain et al. | |
| 5,789,519 A | 8/1998 | Vock et al. | |
| 5,865,624 A | 2/1999 | Hayashigawa | |
| 5,892,554 A | 4/1999 | DiCicco et al. | |
| 5,912,700 A | 6/1999 | Honey et al. | |
| 5,938,545 A | 8/1999 | Cooper et al. | |
| 5,953,056 A | 9/1999 | Tucker | |
| 6,100,925 A | 8/2000 | Rosser et al. | |
| 6,144,375 A | 11/2000 | Jain et al. | |
| 6,154,250 A | 11/2000 | Honey et al. | |
| 6,201,554 B1 | 3/2001 | Lands | |
| 6,224,492 B1 | 5/2001 | Grimes | |
| 6,233,007 B1 | 5/2001 | Carlbom et al. | |
| 6,236,940 B1 | 5/2001 | Rudow et al. | |
| 6,449,010 B1 | 9/2002 | Tucker | |
| 6,520,864 B1 | 2/2003 | Wilk | |
| 6,525,690 B2 | 2/2003 | Rudow et al. | |
| 6,750,919 B1 | 6/2004 | Rosser | |
| 6,774,932 B1 | 8/2004 | Ewing et al. | |
| 6,958,772 B1 * | 10/2005 | Sugimori | H04N 9/045 348/222.1 |
| 7,158,676 B1 * | 1/2007 | Rainsford | H04N 7/17318 348/700 |
| 7,250,952 B2 | 7/2007 | Johnson et al. | |
| 7,315,631 B1 | 1/2008 | Corcoran et al. | |
| 7,356,082 B1 * | 4/2008 | Kuhn | G06F 17/30811 348/699 |
| 7,380,259 B1 | 5/2008 | Schroeder | |
| 7,450,758 B2 * | 11/2008 | Cohen | G06K 9/00711 345/173 |
| 7,529,298 B2 * | 5/2009 | Yasuda | H04N 19/37 348/14.02 |
| 7,693,679 B1 | 4/2010 | Warnke et al. | |
| 7,839,926 B1 | 11/2010 | Metzger et al. | |
| 7,843,510 B1 | 11/2010 | Ayer et al. | |
| 7,873,910 B2 | 1/2011 | Chaudhri et al. | |
| 7,996,771 B2 * | 8/2011 | Girgensohn | G06F 17/3079 348/143 |
| 8,077,917 B2 | 12/2011 | Forsgren | |
| 8,381,259 B1 | 2/2013 | Khosla | |
| 8,495,697 B1 | 7/2013 | Goldfeder et al. | |
| 8,648,857 B2 | 2/2014 | Williams | |
| 8,702,504 B1 | 4/2014 | Hughes et al. | |
| 8,743,219 B1 | 6/2014 | Bledsoe | |
| 8,756,641 B2 | 6/2014 | Ivanov et al. | |
| 8,949,889 B1 | 2/2015 | Erdmann | |
| 9,094,615 B2 * | 7/2015 | Aman | G01S 3/7864 |
| 9,137,558 B2 | 9/2015 | Gibbon et al. | |
| 9,138,652 B1 | 9/2015 | Thompson et al. | |
| 9,288,545 B2 | 3/2016 | Hill et al. | |
| 9,535,879 B2 | 1/2017 | Allen | |
| 2002/0019258 A1 | 2/2002 | Kim et al. | |
| 2002/0057217 A1 | 5/2002 | Milnes et al. | |
| 2002/0082122 A1 | 6/2002 | Pippin et al. | |
| 2002/0090217 A1 | 7/2002 | Limor et al. | |
| 2002/0118875 A1 * | 8/2002 | Wilensky | G06T 7/0083 382/173 |
| 2002/0168006 A1 | 11/2002 | Yasuda | |
| 2003/0009270 A1 | 1/2003 | Breed | |
| 2003/0021445 A1 | 1/2003 | Larice et al. | |
| 2003/0033602 A1 | 2/2003 | Gibbs et al. | |
| 2003/0103648 A1 | 6/2003 | Ito et al. | |
| 2003/0151835 A1 | 8/2003 | Su et al. | |
| 2003/0210329 A1 * | 11/2003 | Aagaard | H04N 7/181 348/159 |
| 2004/0136592 A1 | 7/2004 | Chen et al. | |
| 2004/0218099 A1 * | 11/2004 | Washington | H04N 5/77 348/571 |
| 2004/0258154 A1 | 12/2004 | Liu et al. | |
| 2004/0261127 A1 | 12/2004 | Freeman et al. | |
| 2005/0040710 A1 | 2/2005 | Ahn | |
| 2005/0052533 A1 | 3/2005 | Ito et al. | |
| 2005/0137958 A1 | 6/2005 | Huber et al. | |
| 2005/0147278 A1 | 7/2005 | Rui et al. | |
| 2005/0237385 A1 | 10/2005 | Kosaka et al. | |
| 2005/0255914 A1 | 11/2005 | McHale et al. | |
| 2006/0003825 A1 | 1/2006 | Iwasaki et al. | |
| 2006/0044410 A1 * | 3/2006 | Shinkai | H04N 9/735 348/223.1 |
| 2006/0078047 A1 * | 4/2006 | Shu | G06F 17/3079 375/240.01 |
| 2006/0078329 A1 | 4/2006 | Ohnishi et al. | |
| 2006/0197839 A1 | 9/2006 | Senior et al. | |
| 2006/0197843 A1 | 9/2006 | Yoshimatsu | |
| 2006/0197849 A1 * | 9/2006 | Wernersson | H04N 1/2141 348/231.99 |
| 2007/0018952 A1 | 1/2007 | Arseneau et al. | |
| 2007/0024706 A1 * | 2/2007 | Brannon, Jr. | H04N 7/17318 348/142 |
| 2007/0076957 A1 * | 4/2007 | Wang | G06K 9/00234 382/195 |
| 2007/0139562 A1 | 6/2007 | Miyake | |
| 2007/0198939 A1 | 8/2007 | Gold | |
| 2008/0019299 A1 | 1/2008 | Lekutai et al. | |
| 2008/0021651 A1 | 1/2008 | Seeley et al. | |
| 2008/0129825 A1 * | 6/2008 | DeAngelis | A63B 24/0021 348/169 |
| 2008/0129844 A1 * | 6/2008 | Cusack et al. | 348/241 |
| 2008/0175441 A1 | 7/2008 | Matsumoto et al. | |
| 2008/0192116 A1 | 8/2008 | Tamir et al. | |
| 2008/0199043 A1 | 8/2008 | Forsgren | |
| 2008/0261711 A1 | 10/2008 | Tuxen | |
| 2008/0277486 A1 | 11/2008 | Seem et al. | |
| 2008/0311983 A1 | 12/2008 | Koempel et al. | |
| 2009/0003599 A1 * | 1/2009 | Hart | H04L 67/2823 380/209 |
| 2009/0009605 A1 * | 1/2009 | Ortiz | H04N 5/232 348/157 |
| 2009/0021583 A1 * | 1/2009 | Salgar et al. | 348/159 |
| 2009/0028440 A1 | 1/2009 | Elangovan et al. | |
| 2009/0031382 A1 * | 1/2009 | Cope | H04N 9/8205 725/115 |
| 2009/0037605 A1 * | 2/2009 | Li | G06Q 20/12 709/246 |
| 2009/0040308 A1 | 2/2009 | Temovskiy | |
| 2009/0046152 A1 | 2/2009 | Aman | |
| 2009/0066782 A1 * | 3/2009 | Choi et al. | 348/25 |
| 2009/0067670 A1 | 3/2009 | Johnson et al. | |
| 2009/0082139 A1 | 3/2009 | Hart | |
| 2009/0136226 A1 | 5/2009 | Wu et al. | |
| 2009/0140976 A1 | 6/2009 | Bae et al. | |
| 2009/0160735 A1 | 6/2009 | Mack | |
| 2009/0225845 A1 | 9/2009 | Veremeev et al. | |
| 2009/0245571 A1 | 10/2009 | Chien et al. | |
| 2009/0262137 A1 | 10/2009 | Walker et al. | |
| 2009/0271821 A1 | 10/2009 | Zalewski | |

(56) References Cited

U.S. PATENT DOCUMENTS

| | | | | |
|---|---|---|---|---|
| 2009/0284601 | A1* | 11/2009 | Eledath | G06K 9/209 |
| | | | | 348/157 |
| 2009/0290848 | A1* | 11/2009 | Brown | H04N 5/232 |
| | | | | 386/223 |
| 2010/0077435 | A1* | 3/2010 | Kandekar | G11B 27/005 |
| | | | | 725/61 |
| 2010/0091017 | A1 | 4/2010 | Kmiecik et al. | |
| 2010/0095345 | A1* | 4/2010 | Tran | G11B 27/105 |
| | | | | 725/131 |
| 2010/0141772 | A1 | 6/2010 | Inaguma et al. | |
| 2010/0179005 | A1 | 7/2010 | Meadows et al. | |
| 2010/0192088 | A1 | 7/2010 | Iwano | |
| 2010/0208082 | A1* | 8/2010 | Buchner | H04H 20/18 |
| | | | | 348/207.1 |
| 2010/0265125 | A1 | 10/2010 | Kelly et al. | |
| 2010/0265344 | A1* | 10/2010 | Velarde et al. | 348/208.16 |
| 2010/0289904 | A1 | 11/2010 | Zhang et al. | |
| 2010/0289913 | A1 | 11/2010 | Fujiwara | |
| 2010/0321389 | A1 | 12/2010 | Gay et al. | |
| 2011/0013087 | A1 | 1/2011 | House et al. | |
| 2011/0013836 | A1 | 1/2011 | Gefen et al. | |
| 2011/0016497 | A1 | 1/2011 | Bloom et al. | |
| 2011/0067065 | A1 | 3/2011 | Karaoguz et al. | |
| 2011/0149094 | A1 | 6/2011 | Chen et al. | |
| 2011/0149103 | A1* | 6/2011 | Hatakeyama | G06T 5/003 |
| | | | | 348/222.1 |
| 2011/0169959 | A1 | 7/2011 | Deangelis et al. | |
| 2011/0181728 | A1 | 7/2011 | Tieman et al. | |
| 2011/0191023 | A1 | 8/2011 | Engstrom | |
| 2011/0205022 | A1 | 8/2011 | Cavallaro et al. | |
| 2011/0292030 | A1 | 12/2011 | Jiang et al. | |
| 2011/0304843 | A1 | 12/2011 | Rogers et al. | |
| 2012/0060101 | A1 | 3/2012 | Vonog et al. | |
| 2012/0090010 | A1 | 4/2012 | Dace et al. | |
| 2012/0154593 | A1 | 6/2012 | Anderson | |
| 2012/0277036 | A1 | 11/2012 | Lee | |
| 2012/0295679 | A1 | 11/2012 | Izkovsky et al. | |
| 2012/0316843 | A1 | 12/2012 | Beno et al. | |
| 2012/0331387 | A1 | 12/2012 | Lemmey et al. | |
| 2013/0016099 | A1 | 1/2013 | Rinard et al. | |
| 2013/0041755 | A1 | 4/2013 | Ivanov | |
| 2013/0211774 | A1 | 8/2013 | Bentley et al. | |
| 2013/0227596 | A1 | 8/2013 | Pettis et al. | |
| 2014/0005929 | A1 | 1/2014 | Gale et al. | |
| 2014/0229996 | A1 | 8/2014 | Ellis et al. | |
| 2014/0236331 | A1 | 8/2014 | Lehmann et al. | |
| 2014/0240500 | A1 | 8/2014 | Davies | |
| 2014/0245367 | A1 | 8/2014 | Sasaki et al. | |
| 2014/0266160 | A1 | 9/2014 | Coza | |
| 2014/0344839 | A1 | 11/2014 | Woods et al. | |
| 2015/0057108 | A1 | 2/2015 | Regimbal et al. | |
| 2015/0062339 | A1 | 3/2015 | Ostrom | |
| 2015/0094883 | A1 | 4/2015 | Peeters et al. | |
| 2015/0149250 | A1 | 5/2015 | Fein et al. | |
| 2015/0149837 | A1 | 5/2015 | Alonso et al. | |
| 2015/0226828 | A1 | 8/2015 | Davies et al. | |
| 2015/0234454 | A1 | 8/2015 | Kurz | |
| 2015/0318020 | A1 | 11/2015 | Pribula | |
| 2015/0370818 | A1 | 12/2015 | Des Jardins et al. | |
| 2015/0382076 | A1 | 12/2015 | Davisson et al. | |
| 2016/0173958 | A1 | 6/2016 | Ryu et al. | |
| 2016/0198228 | A1 | 7/2016 | Hill et al. | |
| 2016/0203694 | A1 | 7/2016 | Hogsten et al. | |
| 2016/0217345 | A1 | 7/2016 | Appel et al. | |
| 2017/0201779 | A1 | 7/2017 | Publicover et al. | |
| 2017/0280199 | A1 | 9/2017 | Davies et al. | |
| 2017/0366866 | A1 | 12/2017 | Davies et al. | |

FOREIGN PATENT DOCUMENTS

| | | |
|---|---|---|
| EP | 2575079 | 4/2013 |
| JP | H06105231 A | 4/1994 |
| JP | H07141022 A | 6/1995 |
| JP | H08164896 | 6/1996 |
| JP | H0952555 | 2/1997 |
| JP | 2001268562 | 9/2001 |
| JP | 2003-125414 A | 4/2003 |
| JP | 2003162213 A | 6/2003 |
| JP | 2003242517 | 8/2003 |
| JP | 2004048116 | 2/2004 |
| JP | 2004056473 | 2/2004 |
| JP | 2004354236 | 12/2004 |
| JP | 2004354256 | 12/2004 |
| JP | 2005073218 | 3/2005 |
| JP | 2005144003 A | 6/2005 |
| JP | 2005159385 A | 6/2005 |
| JP | 2006081696 A | 3/2006 |
| JP | 2006340108 A | 12/2006 |
| JP | 2008005110 | 1/2008 |
| JP | 2008035006 | 2/2008 |
| JP | 2008199370 | 8/2008 |
| JP | 20080199370 | 8/2008 |
| JP | 2009-188976 A | 8/2009 |
| JP | 2009194234 | 8/2009 |
| JP | 2010005267 A | 1/2010 |
| JP | 2010-152556 A | 7/2010 |
| JP | 2010194074 A | 9/2010 |
| JP | 2010245821 | 10/2010 |
| JP | 2011108165 | 6/2011 |
| JP | 2011130112 | 6/2011 |
| JP | 2011183138 A | 9/2011 |
| JP | 2011-527527 A | 10/2011 |
| JP | 2012034365 | 2/2012 |
| JP | 2012095914 A | 5/2012 |
| JP | 2013020308 | 1/2013 |
| JP | 2013118712 A | 6/2013 |
| KR | 20060134702 | 12/2006 |
| KR | 1020090056047 | 6/2009 |
| KR | 20130086814 | 8/2013 |
| KR | 20140023136 | 2/2014 |
| WO | 9728856 | 8/1997 |
| WO | 0114021 | 3/2001 |
| WO | 0228093 | 4/2002 |
| WO | 2005027516 | 3/2005 |
| WO | 2008057285 | 5/2008 |
| WO | 2010140858 | 12/2010 |
| WO | 2012051054 | 4/2012 |
| WO | 2014036363 | 3/2014 |

OTHER PUBLICATIONS

International Application No. PCT/US2014/025362 International Search Report and Written Opinion dated Aug. 19, 2014, 15 pages.
New Zealand Application No. 620992 First Examination Report dated Jul. 15, 2014, 2 pages.
EP Application No. 12822586.9 Extended European Search Report dated Feb. 5, 2015, 6 pages.
International Application No. PCT/US2013/057450 International Search Report and Written Opinion dated Dec. 27, 2013, 12 pages.
CN Application No. 201280044974.9 First Office Action and Search Report dated Sep. 30, 2015, 14 pages.
EP Application No. 15156533.0 Extended European Search Report dated Jun. 10, 2015, 6 pages.
New Zealand Patent Application No. 620992 Further Examination Report dated Feb. 1, 2016, 3 pages.
New Zealand Patent Application No. 715962 First Examination Report dated Feb. 1, 2016, 2 pages.
U.S. Appl. No. 14/207,998 Non-Final Office Action dated Dec. 2, 2015, 33 pages.
U.S. Appl. No. 14/424,632 Non-Final Office Action dated Nov. 6, 2015, 25 pages.
U.S. Appl. No. 14/804,637 Notice of Allowance dated Nov. 17, 2015, 18 pages.
EP Application No. 12832174.0 Extended European Search Report dated Mar. 23, 2016, 9 pages.
International Application No. PCT/US2015/065472 International Search Report and Written Opinion dated Apr. 5, 2016, 14 pages.
International Application No. PCT/US2015/065474 International Search Report and Written Opinion dated May 4, 2016, 12 pages.

(56) References Cited

OTHER PUBLICATIONS

International Application No. PCT/US2015/065477 International Search Report and Written Opinion dated May 4, 2016, 11 pages.
International Application No. PCT/US2015/065481 International Search Report and Written Opinion dated May 4, 2016, 12 pages.
Australian Patent Application No. 2012294568 Office Action dated Aug. 22, 2016, 3 pages.
China Application No. 201280044974.9 Second Office Action dated Jul. 22, 2016, 10 pages.
U.S. Appl. No. 14/207,998 Final Office Action dated Sep. 9, 2016, 36 pages.
JP Patent Application No. 2014-525086 Notice of Reasons for Rejection dated May 10, 2016, 5 pages.
New Zealand Patent Application No. 719619 First Examination Report dated May 19, 2016, 3 pages.
U.S. Appl. No. 15/068,819 Non-Final Office Action dated May 6, 2016, 21 pages.
Austrialian Application No. 2014244374 Examination Report No. 1, dated Mar. 17, 2017, 3 pages.
EP Application No. 12822586.9 Office Action dated Feb. 28, 2017, 4 pages.
EP Application No. 13832174.0 Office Action dated Apr. 25, 2017, 4 pages.
EP Application No. 14776040.9 Extended European Search Report dated Oct. 7, 2016, 8 pages.
JP Patent Application No. 2014-525086 Decision of Rejection dated Nov. 8, 2016, 4 pages.
First Examination Report for New Zealand IP No. 734221, dated Aug. 28, 2017 (2 pp.).
Further Examination Report for New Zealand IP No. 719619, dated Oct. 16, 2017 (1 pp.).
Further Examination Report for New Zealand IP No. 719619, dated Sep. 20, 2017 (2 pp.).
Rodrigues, Pedro. "A Field, Tracking and Video Editor Tool for a Football Resource Planner", IEEE Conference Publications, US, 2013 (6 pp.).
Notice of Reasons for Refusal for Japanese Patent Application No. 2015-530081, dated Oct. 10, 2017 (10 pp.).
EP Application No. 15156533 Office Action dated May 15, 2017, 4 pages.
U.S. Appl. No. 14/207,998 Non-Final Office Action dated Jun. 30, 2017, 46 pages.
EP Application No. 14776040.9 Office Action dated Dec. 8, 2017, 4 pages.
U.S. Appl. No. 15/621,126 Non-Final Office Action dated Dec. 20, 2017, 34 pages.
U.S. Appl. No. 14/207,998 Final Office Action dated Feb. 22, 2018, 26 pages.
Australian Application No. 2013308641 Examination Report No. 1 dated Mar. 8, 2018, 4 pages.
EP Application No. 15867249 EP Search Report and Written Opinion dated May 17, 2018, 8 pages.
EP Application No. 15867985 Supplementary EP Search Report and Written Opinion dated May 30, 2018, 9 pages.
EP Application No. 15868450 Supplementary EP Search Report and Written Opinion dated Jun. 1, 2018, 9 pages.
EP Application No. 15868581 Supplementary EP Search Report and Written Opinion dated Jun. 1, 2018, 8 pages.
JP Patent Application No. 2014-525086 English Translation of Trial Decision issued Apr. 3, 2018, 17 pages.
JP Patent Application No. 2016-501836 Notice of Reasons for Refusal dated May 18, 2018, 6 pages.
U.S. Appl. No. 14/424,632 Non-Final Office Action dated Jun. 28, 2018, 44 pages.
Australian Application No. 151189D1AU Examination Report No. 1 dated Nov. 27, 2018, 3 pages.
International Application No. PCT/US2018/035007 International Search Report and Written Opinion dated Sep. 17, 2018, 10 pgs.
U.S. Appl. No. 15/535,243 Non-Final Office Action dated Sep. 27, 2018, 50 pages.
U.S. Appl. No. 15/535,257 Non-Final Office Action dated Sep. 20, 2018, 51 pages.
Australian Application No. 2017219030 Office Action dated Feb. 12, 2019, 4 pages.
JP Patent Application No. 2016-501836 Notice of Reasons for Refusal dated Jan. 15, 2019, 3 pages.
U.S. Appl. No. 14/424,632 Final Office Action dated Feb. 8, 2019, 27 pages.
AU Application No. 2015360249 Examination Report No. 1 dated May 9, 2019, 4 pages.
AU Application No. 2015360250 Examination Report No. 1 dated May 23, 2019, 5 pages.
AU Application No. 2015360251 Examination Report No. 1 dated May 17, 2019, 5 pages.
AU Application No. 2015360252 Examination Report No. 1 dated May 8, 2019, 4 pages.
EP Application No. 15867249.3 Office Action dated Jun. 6, 2019, 8 pages.
EP Application No. 15867985.2 Office Action dated Jun. 6, 2019, 8 pages.
EP Application No. 15868450.6 Office Action dated Jun. 6, 2019, 9 pages.
EP Application No. 15868581.8 Office Action dated Jun. 6, 2019, 7 pages.
JP Patent Application No. 2017-531609 Notice of Reasons for Refusal dated Jun. 18, 2019, 3 pages.
JP Patent Application No. 2017-531610 Notice of Reasons for Refusal dated Jun. 18, 2019, 3 pages.
U.S. Appl. No. 15/535,243 Final Office Action dated Jul. 2, 2019, 27 pages.
NZ Application No. 751181 First Examination Report dated Mar. 21, 2019, 2 pages.
U.S. Appl. No. 15/535,257 Final Office Action dated May 6, 2019, 31 pages.
Golf Relay Broadcast, Proceedings of Workshop of the Institute of Television Engineers of Japan and Institute of Television Engineers of Japan Using Multimedia PC besides Katori, Nov. 26, 1993, vol. 17. No. 74, p. 23-27.
JP Patent Application No. 2017-531612 Notice of Reasons for Refusal dated Jul. 30, 2019, 6 pages.
Relay watch in the "synchronization World Cup 2006" besides ** Group work, broadcast technology, * 6 hall publication incorporated company, Jan. 1, 2007, vol. [ 60th ] No. 1 (716th volume of the set), p. 19-29.
EP Application No. 15867249.3 Oral Proceedings Summons dated Aug. 25, 2020, 10 pages.
U.S. Appl. No. 15/535,243 Non-Final Office Action dated Aug. 6, 2020, 24 pages.
EP Application No. 18809839.6 Extended EP Search Report dated Sep. 11, 2020, 7 pages.
NZ IP No. 768143; First Examination Report; dated Sep. 28, 2020 2 pages.
Mike—More homers? Blame the seats; Published Apr. 20, 2009 (Year: 2009), 3 pages.
Newton—Autodesk wind simulation to enhance Fox Sports Super Bowl coverage; Published Jan. 31, 2014 (Year: 2014), 3 pages.

* cited by examiner

PRIOR ART FIGURE 1

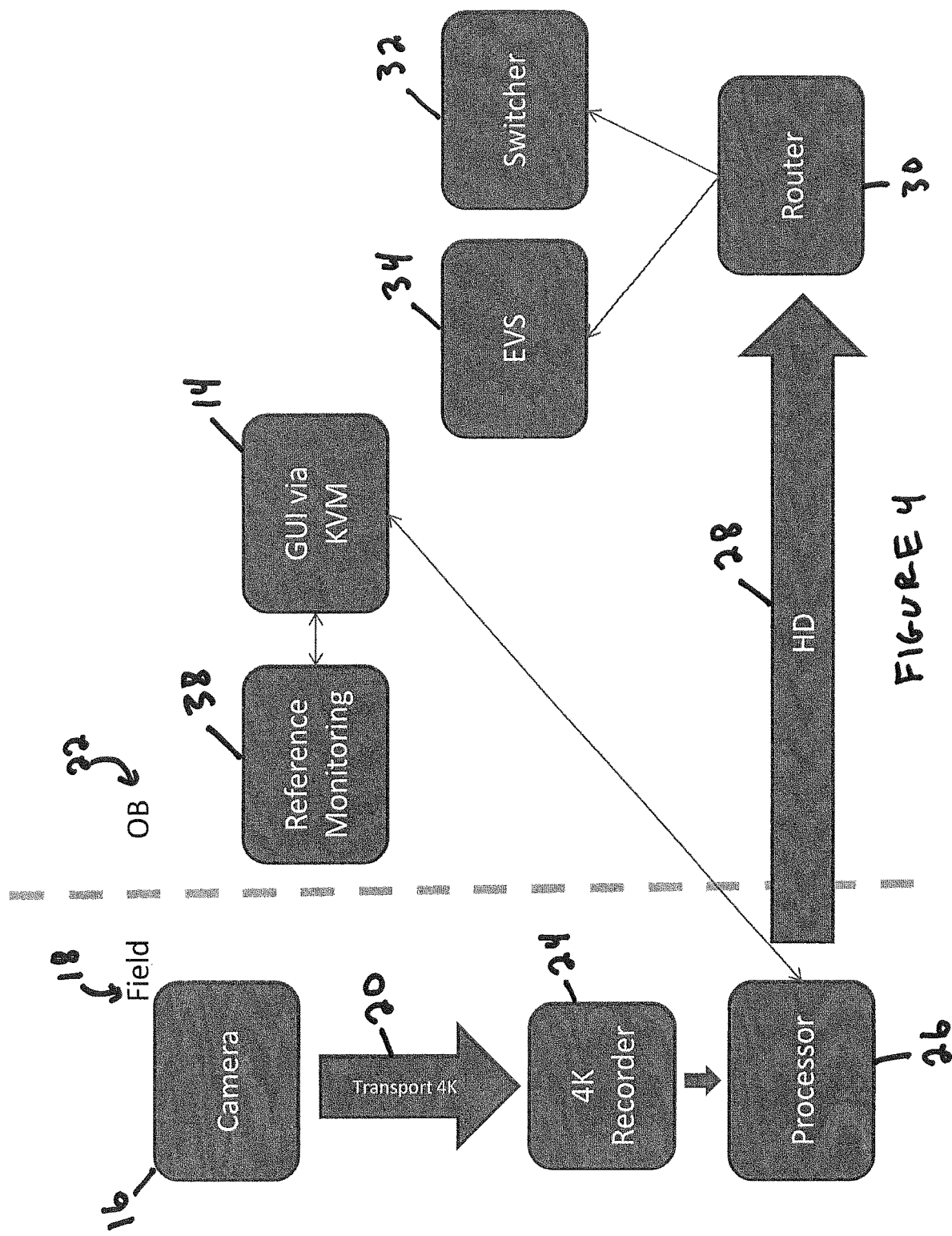

SELECTIVE CAPTURE AND PRESENTATION OF NATIVE IMAGE PORTIONS

CROSS REFERENCE TO RELATED APPLICATIONS

The present application claims priority to U.S. Provisional Patent Application Ser. No. 61/515,549 filed Aug. 5, 2011; and, U.S. Provisional Patent Application Ser. No. 61/563,126 filed Nov. 23, 2011, the entire contents of which are specifically incorporated by reference herein.

BACKGROUND

The present disclosure relates to systems and methods for selective capture of and presentation of native image portions, particularly for use in broadcast production.

Common image or video formats are typically referred to either in terms of vertical resolution or horizontal resolution. FIG. 1 shows an example of relative pixel dimensions at a 2.39:1 aspect ratio, with 720p and 1080p formats being letterboxed.

Examples of vertical high resolution designators are 720p (1280×720 pixels), 1080i (utilizing an interlace of two fields of 1920×540 pixels for a total resolution of 1920×1080 pixels) or 1080p (representing a progressive scan of 1920×1080 pixels).

Examples of horizontal high resolution designators, which are more common to digital cinema terminology, include 2K (2048 pixels wide) and 4 K (4096 pixels wide). Overall resolution would depend on the image aspect ratio, e.g. a 2K image with a Standard or Academy ratio of 4:3 would have an overall ratio of 2048×1536 pixels, whereas an image with a Panavision ratio of 2.39:1 would have an overall ratio of 2048×856 pixels. PRIOR ART FIG. 1 illustrates a comparison of relative pixel dimensions for 720p, 1080p, 2K and 4K captured images.

Currently, technologies exist for greater than high definition capture for digital cinema, e.g. up to 2K, 4 K and beyond. However, for consumer home viewing of the captured digital cinema, the captured image is compressed down at the distributing studio to a version that is specific to traditional usable consumer high definition formats for broadcast or other distribution, e.g., at 720p, 1080i or 1080p.

Also, while digital cinema has utilized large resolution capture, traditional broadcast capture has not. This broadcast capture is performed at the desired consumer display resolution, e.g., 1080p, both due to limitations at the consumer display device as well as to bandwidth restrictions of broadcast carriers. Thus, in scenarios calling for magnification of the broadcast image, for example to better show line calls or to follow specific players on the field, the display resolution of the line calls is considerably less than the native image captured on the field.

Accordingly, there is a need in the art for improved mechanisms for capturing and presenting image material for broadcasts or other image presentation.

SUMMARY

The above described and other problems and disadvantages of the prior art are overcome and alleviated by the present system and method for selective capture of and presentation of native image portions. In exemplary embodiments, a first image or video is captured at a first resolution, which resolution is greater than high definition and higher than a predetermined broadcast display resolution. A desired portion of the first image or video is then displayed at a second, lower resolution, which resolution is less than and closer to the predetermined broadcast display resolution. Accordingly, a selected portion of the captured image may be displayed at or near the predetermined broadcast display resolution (i.e., minimizing or eliminating loss of image detail relative to the predetermined broadcast display resolution).

In further exemplary embodiments, native image capture occurs at greater than high definition resolutions, and portions of that greater than high definition image are selected for presentation. In exemplary embodiments, at least one selected portion is a native high definition portion of the greater than high definition image.

In another exemplary embodiment, a first video is captured at a first frame rate, which frame rate is higher than a predetermined broadcast frame rate. A desired portion of the first video is then displayed at a second, lower frame rate, which frame rate is less than and closer to the predetermined broadcast frame rate. The desired portion of the first video is captured by an extraction window that extracts frames across the native captured video. In such a way, the extracted video provides smooth and clear video, without edgy or blurred frames.

In another exemplary embodiment, a first video is captured at a first resolution and at a first frame rate, which first resolution and first frame rate are higher than a predetermined broadcast display resolution and frame rate. A desired portion of the first video is then selected by an extraction window and is displayed at a second, lower resolution and lower frame rate that is at or near the predetermined broadcast display resolution and frame rate. Accordingly, the captured video can be displayed at or near the predetermined broadcast display resolution and may be displayed with smooth and clear video, without edgy or blurred frames.

In further exemplary embodiments, a graphical user interface ("GUI") is provided with a selectable extraction window that is configured to allow a user to navigate within a captured image and select portions of the captured image for presentation. In exemplary embodiments, the extraction window is configured to allow the user to adjust the size and position of the extraction window. In other exemplary embodiments, the extraction window is configured to track or scan across moving images, e.g., to follow a play or subject of interest during a sporting event.

In other exemplary embodiments, multiple cameras are positioned to capture images from different points of view, and extraction windows may be provided relative to the multiple image captures in a system for selectively displaying portions of native images from different points of view.

The above discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the following FIGURES:

PRIOR ART

FIG. 4 is an exemplary second system for capturing and processing a 4K image onsite, followed by transport of a high definition image offsite.

DETAILED DESCRIPTION

As was noted above, the present disclosure relates to a system and method for selective capture of and presentation of native image portions.

In exemplary embodiments, a first image or video is captured at a first resolution, which resolution is greater than high definition and higher than a predetermined broadcast display resolution. A desired portion of the first image or video is then displayed at a second, lower resolution, which resolution is less than and closer to the predetermined broadcast display resolution. Accordingly, a selected portion of the captured image may be displayed at or near the predetermined broadcast display resolution (i.e., minimizing or eliminating loss of image detail relative to the predetermined broadcast display resolution).

Figure 1:
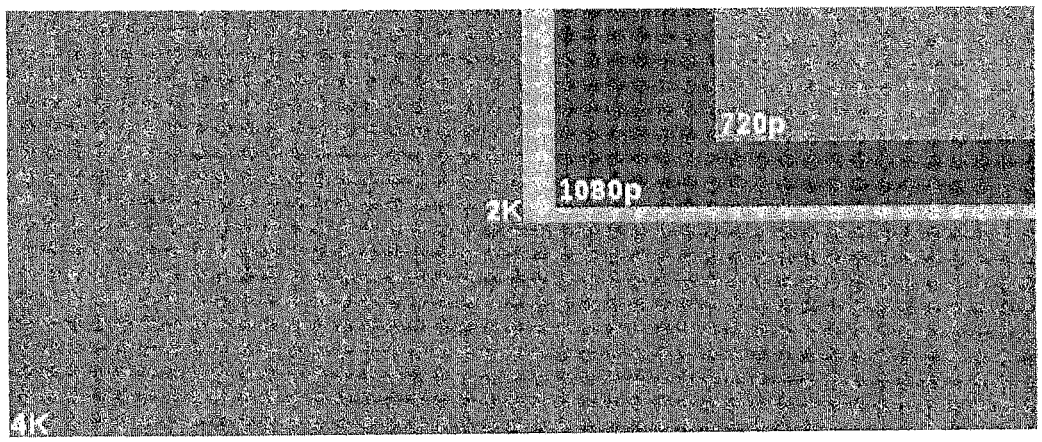
FIG. 1 is a diagram comparing relative pixel dimensions of high definition and greater than high definition images.
Figure 2:
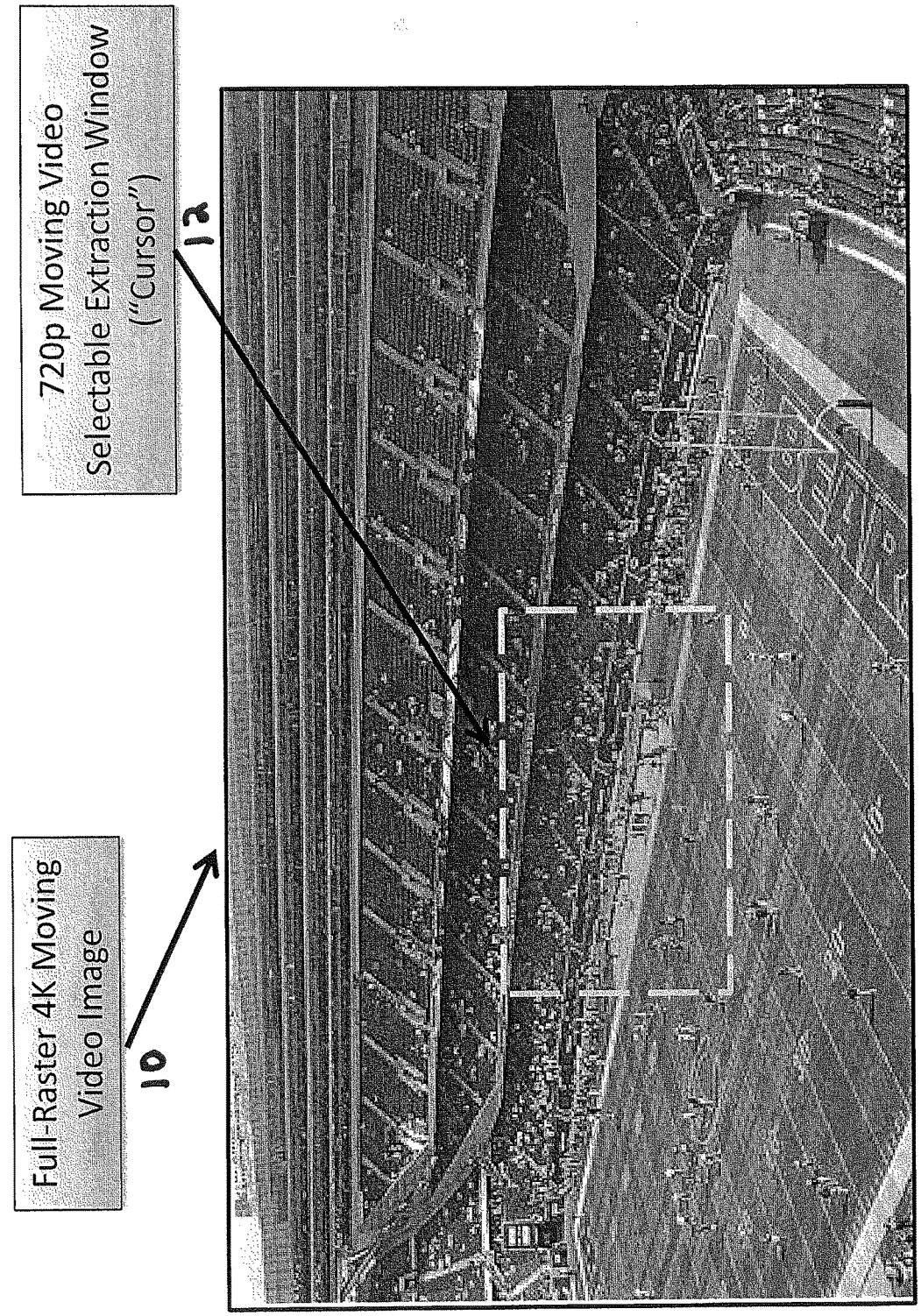
FIG. 2 is an exemplary graphical user interface of a 4K captured image with a 720p selectable extraction window.

An example of this is illustrated at FIG. 2, which shows a screenshot of a full-raster 4K moving video image 10. A portion of the 4K image, illustrated as a 720p moving video selectable extraction window 12, is then selected for presentation. Thus, native image capture occurs at a greater than high definition resolution, and portions of that greater than high definition image are selected for presentation via the 720p extraction window. While, FIG. 2 specifically illustrates 4K capture and a 720p extraction window, it should be recognized that both or either of the captured image and extraction window may be provided at or sized to other resolutions.

Also, while one extraction window is illustrated in FIG. 2, the present disclosure contemplates simultaneous multiple extraction windows that may be applied to the same captured image.

In further exemplary embodiments, the selectable extraction window (12 in FIG. 2) is provided at a graphical user interface ("GUI") (14 in FIGS. 3 and 4) that is configured to allow an operator to navigate within a captured image and select portions of the captured image for presentation. In exemplary embodiments, the extraction window is configured to allow the operator to adjust the size and position of the extraction window. In other exemplary embodiments, the extraction window is configured to track or scan across moving images, e.g., to follow a play or subject of interest during a sporting event. In other exemplary embodiments, plural operators may extract from the same images via the same or via plural GUIs.

Figure 3:
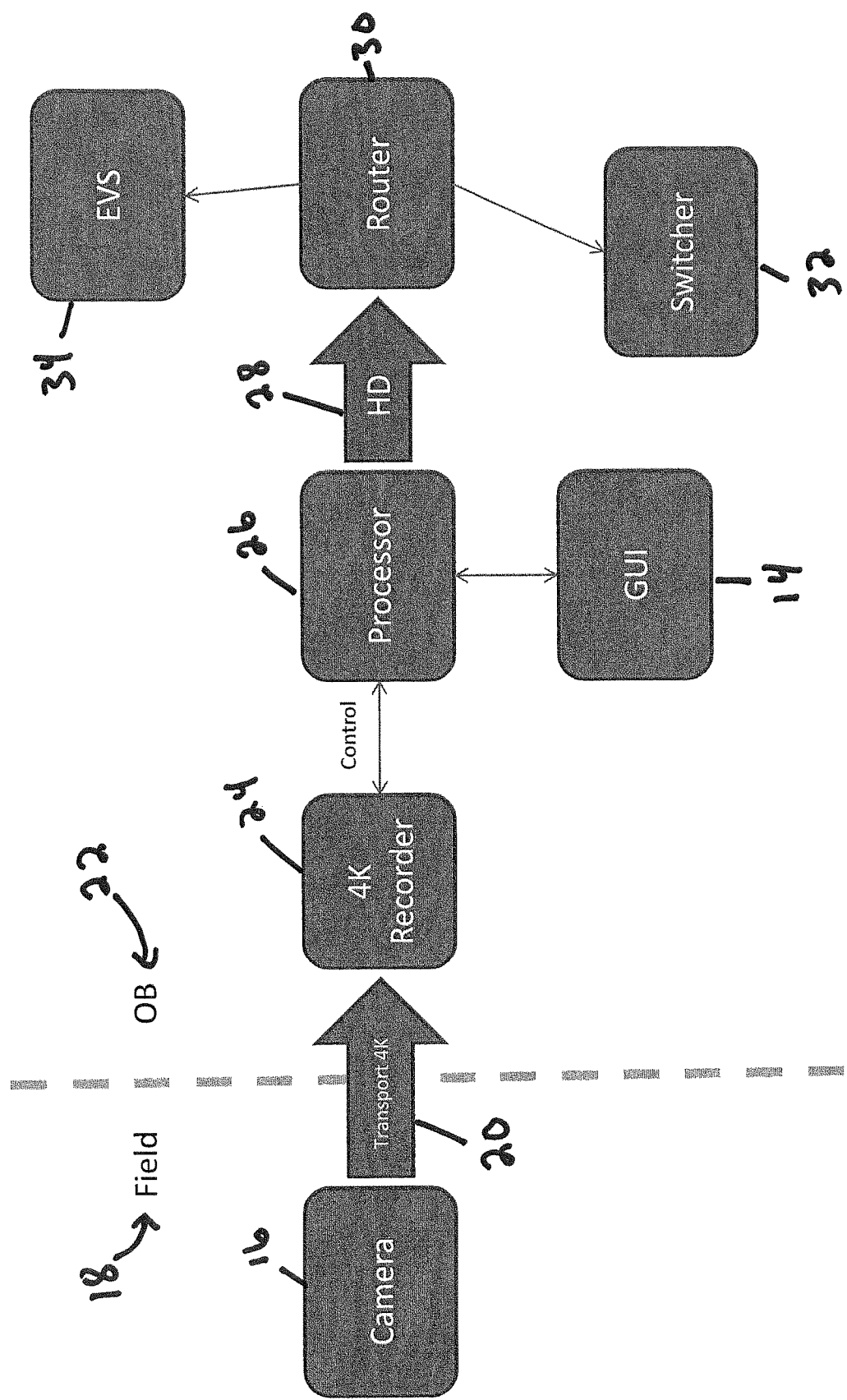
FIG. 3 is an exemplary first system for capturing and transporting a 4K image to an offsite processor and graphical user interface.

Referring now to FIGS. 3 and 4, processing of the captured images may occur either offsite (FIG. 3) or onsite (FIG. 4). Referring to FIG. 3, an exemplary system is illustrated wherein a camera 16 captures 4K images onsite, e.g., at a field (shown generally at 18) for a sporting event. A transport mechanism 20, e.g. a fiber capable of transporting a full bandwidth 4K video, transports the captured images to an operations base ("OB") (shown generally at 22), e.g., a production truck away from the field 18.

An image recorder 24 records the captured images, e.g., as a data stream on a server, and is configured to allow an operator to go back in time relative to the recording and examine selected portions of the captured image as described above. Such control is provided to an operator via the GUI 14 through a processor 26 interfacing with the GUI 14 and recorder 24. In exemplary embodiments, the recorder, processor and GUI are configured to allow the operator to go back instantaneously or near-instantaneously to select portions of the recorded image for presentation.

For example, with regard to FIG. 2, an operator in a truck would use a GUI to navigate the full raster 4K image and maneuver the selective 16:9 extraction window, in a manner similar to a cursor, to select an area of interest. In exemplary embodiments, the GUI is configured such that the extraction window may select an area of interest in one or both of live and recorded video. Also, as has been noted above, the present disclosure contemplates sizing and zooming capabilities for the extraction window. In other exemplary embodiments, the system is configured to mark keyframes and establish mapping for desired moves, e.g., pans and zooms, among others, around the image.

Referring again to FIG. 3, in exemplary embodiments, the output 28 of the system (e.g., a 720p/59.94 output relative to a 4K capture) is provided to a router 30 that allows the output to be taken live to a switcher 32 or to be ingested at a server 34 ("EVS") for later playout. Also, in exemplary embodiments, a resulting image can be slowed down for replay or rendered as a still image, if desired, either at the server 34 or at the operator's position (via processor 26).

FIG. 4 provides an alternate exemplary embodiment, wherein capture, transport and recording of the native image (in this example 4K images) occurs onsite, e.g., at the field 18 of a sporting event). An onsite processor 26 provides or interfaces with an operator GUI 14 in an operations base 22 (e.g., a truck, though the GUI could be accessed from any convenient location) and provides a reference video 38 of the image to allow the operator to navigate the image via the extraction window. The output 28 is then transported from the field to an offsite router 30.

In another embodiment, at least one GUI is accessed by a tablet controller as a navigation tool for the system. Such tablet controller may be wireless and portable to allow for flexible a primary or supplemental navigation tool.

In other exemplary embodiments, multiple cameras may be positioned to capture images from different points of view, and extraction windows may be provided relative to the multiple image captures in a system for selectively displaying portions of native images from different points of view.

Further exemplary embodiments provide real time or near real time tracking of subjects of interest (e.g., identified, selected or pre-tagged players of interest or automatic tracking of a ball in a game). Additional exemplary embodiments also provide virtual directing of operated and automatically tracked subjects of interest for cutting into a full live broadcast, utilizing backend software and tracking technology to provide a virtual viewfinder that operates in manners similar to otherwise human camera operators. Such processes may also use artificial technology for simple tracking, e.g., of a single identified object, or for more complex operations approximating motions utilized by human camera operators, e.g., pan, tilt and zoom of the extraction window in a manner similar to human operators. For those examples using 4K (or the like) capture, camera capture could utilize a specifically designed 4K camera. A camera may also use wider lensing to capture more of the subject, with possible reconstituting or flattening in post production. Also, different lensing can be used specific to different applications.

Such processes may use the above-described multiple cameras and/or multiple extraction windows, or may run with specific regard to one camera and/or one extraction window. In such a way, an artificial intelligence can automatically capture, extract and display material for broadcast, utilizing the extraction window(s) as virtual viewfinders.

Additional exemplary embodiments also provide for virtual 3D extraction, e.g. via s single camera at 4K or 8K with a two window output.

In other exemplary embodiments, an increased image capture frame rates relative to a broadcast frame rate along with or in lieu of an increased image capture resolution, as has been discussed above.

In such embodiments, a first video is captured at a first frame rate, which frame rate is higher than a predetermined broadcast frame rate. A desired portion of the first video is then displayed at a second, lower frame rate, which frame rate is less than and closer to the predetermined broadcast frame rate. The desired portion of the first video is captured by an extraction window that extracts frames across the native captured video. In such a way, the extracted video provides smooth and clear video, without edgy or blurred frames. Such captured first video may be at any frame rate that is above the predetermined broadcast frame rate.

In further exemplary embodiments, the first video is captured at a first frame rate that is in super motion or hyper motion. In traditional video, this equates to approximately 180 ("supermotion") frames per second or above ("hypermotion" or "ultramotion") in a progressive frame rate. In exemplary embodiments, hypermotion is recorded in discrete times sufficient to capture a triggered instance of an action of camera subject for playback. In other exemplary embodiments, the present system performs a full time record of a camera in hypermotion, e.g., of sufficient length for replay playback archiving, such as more than fifteen minutes, more than thirty minutes, more than an hour, more than an hour and a half, or more than two hours, among others.

In other exemplary embodiments, raw data from at least one camera is manipulated to adjust the image quality (make it "paintable") to broadcast specifications. In exemplary embodiments, broadcast "handles" may be integrated into the system to affect the raw data in a manner that is more germane to broadcast color temperatures, hues and gamma variables.

The present disclosure thus advantageously provides systems and methods for selective capture of and presentation of native image portions, for broadcast production or other applications. By providing exemplary embodiments using a selectable extraction window through a GUI, an operator has complete control over portions within the native images that the operator desires for presentation. Also, by providing exemplary embodiments with image capture greater than high definition (e.g., 4K), desired portions of the image selected by an operator may be presented at or relatively near high definition quality (i.e., without relative degradation of image quality). Further, by providing exemplary embodiments with image capture frame rates greater than that of a predetermined broadcast frame rate, extracted video therefrom provides smooth and clear video, without edgy or blurred frames. Finally, various exemplary embodiments utilizing enhanced GUI features, such as automatic tracking of subjects of interests, plural GUIs or extraction windows for one or plural (for different points of view) captured images provide advantageous production flexibilities and advantages.

It will be apparent to those skilled in the art that, while exemplary embodiments have been shown and described, various modifications and variations can be made to the invention disclosed herein without departing from the spirit or scope of the invention. Also, the exemplary implementations described above should be read in a non-limiting fashion, both with regard to construction and methodology. Accordingly, it is to be understood that the various embodiments have been described by way of illustration and not limitation.

What is claimed is:

1. A method for selective capture of and presentation of native broadcast image portions in a broadcast multi-camera system, comprising:
with a first broadcast camera having a first native capture resolution,
capturing a first video at said first native capture resolution, which native capture resolution is greater than high definition and higher than a predetermined second, output broadcast display resolution;
manipulating raw data from said first broadcast camera to make the image quality paintable to broadcast specifications by adjusting the raw data to predetermined broadcast color temperatures, hues and gamma variables including configuring broadcast handles to affect the raw data to adjust the raw data to broadcast color temperatures, hues and gamma variables;
selecting a first desired broadcast portion of captured, native first broadcast video, wherein said first portion is at a resolution lower than that of the captured first video, wherein said first desired broadcast portion is selected via an extraction window that extracts frames across the native captured video;
with a second broadcast camera having a predetermined, second native capture resolution corresponding to said predetermined second, output broadcast display resolution,
capturing a second video at said predetermined second, output broadcast display resolution;
manipulating raw data from said second broadcast camera to make the image quality paintable to broadcast specifications; and
broadcasting one of said selected first portion and said second video at said second, predetermined output display resolution.

2. A method in accordance with claim 1, wherein said first resolution is at or greater than 2K.

3. A method in accordance with claim 2, wherein said first resolution is at or greater than 4K.

4. A method in accordance with claim 2, wherein said second, output broadcast resolution is a high definition resolution.

5. A method in accordance with claim 1, further comprising reconstituting said selected first broadcast portion of the first image or video to said second, output resolution.

6. A method in accordance with claim 5, wherein said first broadcast resolution is a greater than high definition resolution and wherein said second, output broadcast display resolution is a high definition resolution.

7. A method in accordance with claim 1, wherein said selecting of a desired first broadcast portion of the first image or video is provided by a graphical user interface having a selectable extraction window.

8. A method in accordance with claim 7, wherein said extraction window is configured to allow an operator to navigate within said captured broadcast image or video and select broadcast portions thereof for presentation.

9. A method in accordance with claim 7, wherein the extraction window is configured such that it can be adjusted by size and position within the captured broadcast image or video.

10. A method in accordance with claim 7, wherein the extraction window is configured to track or scan across moving broadcast images.

11. A method in accordance with claim 10, wherein said extraction window is configured to follow a subject of interest over time.

12. A method in accordance with claim 1, further comprising:
capturing with a third broadcast camera a third broadcast image or video at a third resolution, which resolution is higher than said predetermined, second output broadcast display resolution;
selecting a first desired broadcast portion of the third broadcast image or video, wherein said first broadcast portion of said third broadcast image or video is at a resolution lower than that of the captured first broadcast image or video;
manipulating raw data from said third broadcast camera to make the image quality paintable to broadcast specifications including configuring broadcast handles to affect the raw data to adjust the raw data to broadcast color temperatures, hues and gamma variables; and
displaying said selected first broadcast portion of said third broadcast image or video at said second, predetermined broadcast output display resolution.

13. A method in accordance with claim 12, wherein said first broadcast resolution and said third broadcast resolution are the same, and wherein said third broadcast image or video is provided via a separate camera from said first broadcast image or video and at a different point of view.

14. A method in accordance with claim 13, wherein graphical user interfaces are provided for each camera, and wherein at least one extraction window is associated with each graphical user interface to facilitate selection of desired broadcast image or video portions.

15. A method in accordance with claim 1, wherein said capturing of a first broadcast image or video occurs at a desired broadcast venue, followed by transmission of said captured first broadcast, image or video to an offsite operations base.

16. A method in accordance with claim 15, further comprising:
recording of said captured first broadcast image or video at said operations base; selecting said first, desired broadcast portion of the first broadcast, image or video at said operations base; and
outputting said selected first broadcast, portion to a router, switcher or server at said second, broadcast output resolution.

17. A method in accordance with claim 1, wherein said capturing of a first, broadcast image or video and recording of said captured first, broadcast image or video occurs at a desired broadcast venue, followed by outputting said selected first broadcast portion to a router, switcher or server at said second, broadcast output resolution.

18. A method in accordance with claim 1, further comprising adjusting raw data from a broadcast camera to affect color temperatures, hues and gamma variables.

19. A system for selective capture of and presentation of native image broadcast portions in a broadcast multi-camera system, comprising:
a first broadcast camera having a first native capture resolution configured to capture a first broadcast image or video at said first resolution, which resolution is greater than high definition and higher than a predetermined second, broadcast output display resolution;
a second, different broadcast camera having a second, different native capture resolution configured to capture a second broadcast image or video at a third resolution, which resolution is greater than high definition and higher than a predetermined second, broadcast output display resolution;
a processor in communication with a graphical user interface, said interface configured to select a first desired broadcast portion of the native, first broadcast image or video, wherein said first broadcast portion is at a resolution lower than that of the captured first broadcast image or video and to keyframe at least said selected broadcast portion by marking keyframes, wherein said processor is also configured to manipulate raw data from each of said broadcast cameras to make the image quality paintable to broadcast specifications, including configuring broadcast handles to affect the raw data to adjust the raw data to broadcast color temperatures, hues and gamma variables; and
an output mechanism configured to transport said selected first broadcast portion to a router, switcher or server at said predetermined second, broadcast output resolution.

20. A system in accordance with claim 19, wherein said first resolution is at or greater than 2K.

21. A system in accordance with claim 20, wherein said first resolution is at or greater than 4K.

22. A system in accordance with claim 20, wherein said second, broadcast output resolution is a high definition resolution.

23. A system in accordance with claim 19, wherein said processor is configured to reconstitute said selected first broadcast portion of the first broadcast image or video to said second, broadcast output resolution.

24. A system in accordance with claim 23, wherein said first resolution is a greater than high definition resolution and wherein said second, broadcast output resolution is a high definition resolution.

25. A system in accordance with claim 19, wherein said graphical user interface has a selectable extraction window.

26. A system in accordance with claim 25, wherein said extraction window is configured to allow an operator to navigate within said captured broadcast image or video and select broadcast portions thereof for presentation.

27. A system in accordance with claim 25, wherein the extraction window is configured such that it can be adjusted by size and position within the captured broadcast image or video.

28. A system in accordance with claim 25, wherein the extraction window is configured to track or scan across moving broadcast images.

29. A system in accordance with claim 28, wherein said extraction window is configured to follow a subject of interest over time.

30. A system in accordance with claim 29, further comprising a second extraction window configured to select a second desired broadcast portion of the first broadcast image or video, wherein said second broadcast portion is at a resolution lower than that of the captured first broadcast image or video.

31. A system in accordance with claim 30, wherein said second extraction window is provided via the same graphical user interface.

32. A system in accordance with claim 31, wherein said separate extraction windows are configured to concurrently select different broadcast portions of said first broadcast image or video.

33. A system in accordance with claim 19, wherein said interface is configured to select a first, desired broadcast portion of the second broadcast image or video, wherein said first broadcast portion of said second broadcast image or video is at a resolution lower than that of the captured second broadcast image or video.

34. A system in accordance with claim 33, wherein said first resolution and said third resolution are the same, and wherein said second broadcast image or video is provided via a separate broadcast camera from said first broadcast image or video and at a different point of view.

35. A system in accordance with claim 34, wherein graphical user interfaces are provided for each broadcast camera, and wherein at least one extraction window is associated with each graphical user interface to facilitate selection of desired broadcast image or video portions.

36. A system in accordance with claim 19, wherein said broadcast camera is configured to capture the first broadcast image or video at a desired broadcast venue, and wherein a transmission mechanism is configured to transmit said captured first broadcast image or video to an offsite operations base.

37. A system in accordance with claim 36, further comprising:
a recording mechanism at said operations base, said recording mechanism configured to record said captured first broadcast image or video, wherein said graphical user interface is provided at said operations base, and wherein said output mechanism is configured to transport said selected first broadcast portion to a separate router, switcher or server.

38. A system in accordance with claim 19, wherein said broadcast camera and output mechanism are provided at said desired broadcast venue.

39. A system in accordance with claim 19, further comprising a tablet controller configured to access at least, one graphical user interface.

40. A system in accordance with claim 19, further comprising a controller for said graphical user interface, the controller configured with marked keyframes and mapping for moves around the captured broadcast image.

41. A system in accordance with claim 40, wherein said moves comprise one or more of panning, zooming and tilting.

42. A method for selective capture of and presentation of native image broadcast portions in a broadcast multi-camera system, comprising:
with a first, broadcast camera having a first native capture resolution,
capturing a first broadcast, video at a first frame rate, which frame rate is higher than a predetermined broadcast frame rate;
with a second, differently configured broadcast, camera having a second, different native capture resolution,
capturing a second broadcast video at a first frame rate, which frame rate is higher than a predetermined broadcast frame rate,
manipulating raw data from each of said first and second broadcast cameras to make the image quality paintable to broadcast specifications including configuring broadcast handles to affect the raw data to adjust the raw data to broadcast color temperatures, hues and gamma variables;
displaying a desired broadcast portion of the native, first broadcast video or the second broadcast video at a second, lower frame rate, which frame rate is less than and closer to the predetermined broadcast frame rate,
wherein the desired portion of the first broadcast video is captured by an extraction window that, extracts frames across the native captured broadcast video;
via virtual directing by an artificial intelligence, automatically tracking subjects of interest and generating a virtual viewfinder relative thereto for cutting into a full live broadcast; and
keyframing at least said extracted broadcast portion by marking keyframes.

43. A method for selective capture of and presentation of native image broadcast portions in a broadcast multi-camera system, comprising:
with a first broadcast camera having a first native capture resolution,
capturing a first broadcast image or video at said first resolution and a first frame rate, which resolution is greater than high definition and higher than a predetermined second, broadcast output display resolution and which frame rate is higher than a predetermined second, broadcast output, display frame rate;
selecting a first desired broadcast portion of the captured, native first broadcast image or video, wherein said first, broadcast portion is at a resolution lower than that of the captured first broadcast image or video;
with a second, differently configured broadcast camera having a third, different native capture resolution,
capturing a second broadcast video at said third native capture resolution, which native capture resolution is greater than high definition and higher than a predetermined second, output broadcast display resolution;
selecting a second desired broadcast portion of the captured, native second broadcast-video from the second broadcast camera, wherein said second portion is at a resolution lower than that of the captured second broadcast video, wherein said second desired broadcast portion is selected via an extraction window that extracts frames across the native captured video;
manipulating raw data from each of said broadcast cameras to make the image quality paintable to broadcast specifications, including configuring broadcast handles to affect the raw data to adjust the raw data to broadcast color temperatures, hues and gamma variables; and
broadcasting said selected first, broadcast portion at said second, broadcast output resolution and at said second, broadcast output frame rate.

44. A method for selective capture of and presentation of native image broadcast portions, comprising:
capturing, with a first broadcast camera having a first native capture resolution, a first broadcast image or video at said first resolution and a first frame rate;
selecting a first desired broadcast portion of the native first broadcast image or video using artificial intelligence or tracking software that is configured to follow at least one object within the natively captured first broadcast image or video,
manipulating raw data from said first broadcast camera to make the image quality paintable to broadcast specifications including configuring broadcast handles to affect the raw data to adjust the raw data to broadcast color temperatures, hues and gamma variables;
keyframing at least said selected broadcast portion by marking keyframes;
wherein said first broadcast image or video is captured at a greater than high definition resolution;
wherein said artificial intelligence or tracking software is configured to at least partially mimic, using an extraction window, the look or effect of natural image capture, including pan, tilt and zoom functions; and displaying said selected first broadcast portion at a broadcast output resolution and at an output frame rate.

45. A method in accordance with claim 44, wherein said first frame rate is at a supermotion or hypermotion frame rate.

46. A method in accordance with claim 44, wherein said natively captured first broadcast image or video is flattened using lensing.

47. A method in accordance with claim 44, wherein said artificial intelligence or tracking software is configured to control multiple extraction windows for selective display during broadcast of portions of said first broadcast image or video.

48. A method in accordance with claim 44, wherein said artificial intelligence or tracking software is configured to control multiple extraction windows for selective broadcast of broadcast portions of plural native, broadcast images or video.

49. A method in accordance with claim 44, wherein said second captured broadcast image or video is positioned at a different point of view relative to said first broadcast image or video.

50. A method in accordance with claim 45, wherein said frame rate is a hypermotion framerate, and further comprising recording said hypermotion framerate.

51. A method in accordance with claim 50, wherein said recording comprises recording of at least fifteen minutes of hypermotion video.

52. A method in accordance with claim 50, wherein said recording comprises recording of at least thirty minutes of hypermotion video.

53. A method in accordance with claim 50, wherein said recording comprises recording of at least an hour of hypermotion video.

54. A method in accordance with claim 50, wherein said recording comprises recording of at least an hour and a half of hypermotion video.

55. A method in accordance with claim 50, wherein said recording comprises recording of at least two hours of hypermotion video.

56. A system for selective capture of and presentation of native image broadcast portions in a broadcast multi-camera system, comprising:

a first, broadcast camera having a first native capture resolution configured to capture a first broadcast image or video at said first resolution, which resolution is greater than high definition and higher than a predetermined second, broadcast output display resolution;

a second, differently configured, broadcast camera having a second, different native capture resolution configured to capture a second broadcast image or video at a third resolution, the second broadcast camera configured to capture said broadcast image or video from a different point of view;

a processor in communication with at least one graphical user interface, said at least one interface configured to select plural broadcast portions of the native, first broadcast image or video and to manipulate raw data from each of said first and second broadcast cameras to make the image quality paintable to broadcast specifications including integrated broadcast handles configured to affect the raw data to adjust the raw data to broadcast color temperatures, hues and gamma variables, wherein said plural broadcast portions are at a resolution lower than that of the captured first broadcast image or video, the at least one user interface configured to control extraction windows relative to the image captures of said first and second broadcast cameras configured to selectively display portions of native images from different points of view and an output mechanism configured to transport said selected broadcast portions to a router, switcher or server at said second, broadcast output resolution.

* * * * *